(12) United States Patent
Sharma et al.

(10) Patent No.: US 10,496,314 B2
(45) Date of Patent: *Dec. 3, 2019

(54) ASYNCHRONOUS SEMI-INLINE DEDUPLICATION

(71) Applicant: NetApp Inc., Sunnyvale, CA (US)

(72) Inventors: Alok Sharma, Bangalore (IN); Girish Hebbale Venkata Subbaiah, Bangalore (IN); Kartik Rathnakar, Bengaluru (IN); Venkateswarlu Tella, Bangalore (IN); Mukul Sharma, Raebarel (IN)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,328

(22) Filed: Feb. 23, 2018

(65) Prior Publication Data

US 2018/0181339 A1 Jun. 28, 2018

Related U.S. Application Data

(63) Continuation of application No. 15/386,544, filed on Dec. 21, 2016, now Pat. No. 10,001,942.

(51) Int. Cl.
*G06F 3/00* (2006.01)
*G06F 3/06* (2006.01)

(52) U.S. Cl.
CPC .......... *G06F 3/0641* (2013.01); *G06F 3/0608* (2013.01); *G06F 3/0683* (2013.01)

(58) Field of Classification Search
None
See application file for complete search history.

(56) References Cited

U.S. PATENT DOCUMENTS

| | | |
|---|---|---|
| 8,548,953 B2 | 10/2013 | Wong et al. |
| 8,799,367 B1 | 8/2014 | Condict et al. |
| 9,043,430 B2 | 5/2015 | Condict et al. |
| 9,280,288 B2 | 3/2016 | Condict et al. |
| 9,529,545 B1 | 12/2016 | Bono et al. |
| 9,634,920 B1 | 4/2017 | Goldberg et al. |
| 2009/0204649 A1 | 8/2009 | Wong et al. |
| 2017/0277596 A1 | 9/2017 | Kyathanahalli et al. |
| 2017/0277597 A1 | 9/2017 | Dillon et al. |

OTHER PUBLICATIONS

Notice of Allowance cited in U.S. Appl. No. 15/386,544 dated Dec. 20, 2017, 19 pgs.

*Primary Examiner* — Midys Rojas
(74) *Attorney, Agent, or Firm* — Cooper Legal Group, LLC

(57) ABSTRACT

Techniques are provided for asynchronous semi-inline deduplication. A multi-tiered storage arrangement comprises a first storage tier, a second storage tier, etc. An in-memory change log of data recently written to the first storage tier is evaluate to identify a fingerprint of a data block recently written to the first storage tier. A donor data store, comprising fingerprints of data blocks already stored within the first storage tier, is queried using the fingerprint. If the fingerprint is found, then deduplication is performed for the data block to create deduplicated data based upon a potential donor data block within the first storage tier. The deduplicated data is moved from the first storage tier to the second storage tier, such as in response to a determination that the deduplicated data has not been recently accessed. The deduplication is performed before cold data is moved from first storage tier to second storage tier.

20 Claims, 10 Drawing Sheets

ASYNCHRONOUS SEMI-INLINE DEDUPLICATION

RELATED APPLICATIONS

This application claims priority to and is a continuation of U.S. application Ser. No. 15/386,544, filed on Dec. 21, 2016, now allowed, titled "ASYNCHRONOUS SEMI-INLINE DEDUPLICATION," which is incorporated herein by reference.

BACKGROUND

Many storage environments may implement functionality to improve storage efficiency. Deduplication is a technique for storage efficiency and can be in the form of post process deduplication and inline deduplication. For example, a storage controller may store data within a storage device. Post-process deduplication may be performed to remove redundant data within the storage device after the data has already been stored within the storage device. In particular, a deduplication scanner detects and eliminates redundant data by scanning all recent data within the storage device. Post-process deduplication has less of a latency impact on a write path of the storage controller because deduplication is not performed inline within the write path over which the storage controller receives and processes write requests from clients. However, additional storage must be provided within the storage device to initially store the redundant data. Also, undesirable on-disk fragmentation occurs as redundant data is freed from the storage device, which can impact I/O on disk based storage devices. Post-process deduplication requires additional system resources to identify redundant data, such as resources used to perform sorting, maintaining hashing tables, etc. While post-process deduplication is being performed, regular I/O to the storage device can be impacted, thus clients may experience unpredictable performance degradation.

Inline deduplication can be performed in the write path in order to remove redundant data before the redundant data reaches the storage device. Inline deduplication does not require the additional overhead and resources used by post-process deduplication because redundant data is eliminated in the write path before reaching the storage device. Inline deduplication also eliminates redundant data without creating on-disk fragmentation since merely unique data is written to the storage device. However, inline deduplication can impact latency of write requests by clients because deduplication is performed within the write path. Thus, write requests can be completed and responded back to clients by the storage controller in a delayed manner.

DETAILED DESCRIPTION

Figure 1:
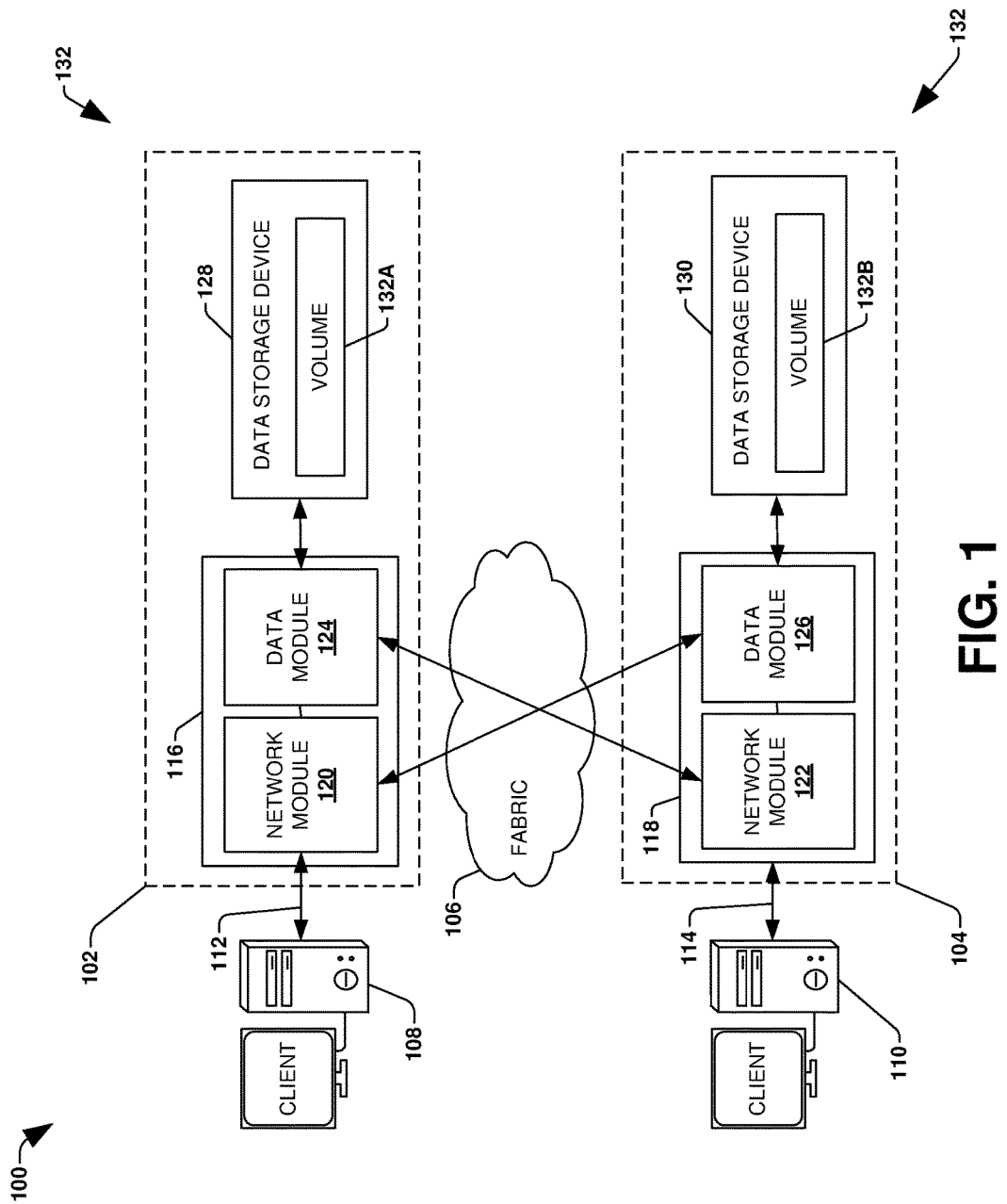
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for asynchronous semi-inline deduplication are provided herein. For example, a storage environment may comprise multiple storage tiers, such as a first storage tier (e.g., a relatively lower latency storage tier, such as a solid state storage tier or a random access memory (RAM) or other in-core memory storage tier), a second storage tier (e.g., a relatively higher latency storage tier, such as a hard disk drive storage tier), and/or other tiers such as a third storage tier (e.g., a distributed network storage environment such as a cloud storage network), etc. Data may be moved from one storage tier to another storage tier when the data becomes "cold", such as when the data is infrequently accessed or has not been accessed for a threshold amount of time. For example, data may be initially stored within a solid state storage tier because the data can be quickly accessed with low latency. However, the solid state storage tier may have limited storage capacity due to cost. Thus, data that is frequently accessed may remain within the solid state storage tier, while data that is infrequently accessed is moved to cheaper storage such as a hard disk drive storage tier. It would be advantageous to improve storage and operating efficiency of the storage environment by performing deduplication at one storage tier before moving data to a different storage tier, thus resulting in reduced data transfer bandwidth by not transferring redundant data, minimal impact upon on-disk fragmentation otherwise occurring if deduplication is performed at a hard disk drive storage tier, minimal impact on I/O latency otherwise occurring if deduplication is performed inline with a write path, etc.

Performing asynchronous semi-inline deduplication for the first storage tier, when compared to post-process deduplication, helps reduce the latency of write operations for the first storage tier. Performing asynchronous semi-inline deduplication reduces a number of incoming write operations to the second storage tier since deduplication occurs in the first storage tier. Performing asynchronous semi-inline deduplication reduces a transport cost between the first storage tier and the second storage tier since an amount of data being transported is reduced. Performing asynchronous semi-inline deduplication reduces on-disk fragmentation for the second storage tier, and also reduces an amount of data processed by post-process deduplication.

Accordingly, as provided herein, asynchronous semi-inline deduplication may be performed at a first storage tier (e.g., a solid state storage tier) before "cold" data (e.g., infrequently accessed data) is moved from the first storage tier to a second storage tier (e.g., a hard disk drive storage tier). The asynchronous semi-inline deduplication may be performed outside of a write path for the first storage tier, thus having minimal impact on latency of the write path compared to inline deduplication. The asynchronous semi-inline deduplication can be performed at the first storage tier, such as the solid state storage tier, before data is moved for the second storage tier, such as the hard disk drive storage tier, which reduces on-disk fragmentation that would otherwise occur if post-process deduplication was performed within the hard disk drive storage tier. Storage allocation at the second storage tier is conserved because there is no need for additional allocation of storage to hold redundant data since the redundant data is eliminated at the first storage tier. The asynchronous semi-inline deduplication is less resource intensive than post-procession deduplication. Data transfer bandwidth is reduced because redundant data is not transferred to the second storage tier.

To provide asynchronous semi-inline deduplication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the data module 126 of node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the data module 126, thereby accessing volume 132B associated with the data storage device 130.

It may be appreciated that asynchronous semi-inline deduplication may be implemented within the clustered network environment 100. In an example, the data storage device 128 may be associated with a first storage tier and the data storage device 130 may be associated with a second storage tier. Accordingly, asynchronous semi-inline deduplication may be performed for the data storage device 128 before "cold" data is moved from the data storage device 128 to the data storage device 130. It may be appreciated that asynchronous semi-inline deduplication may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
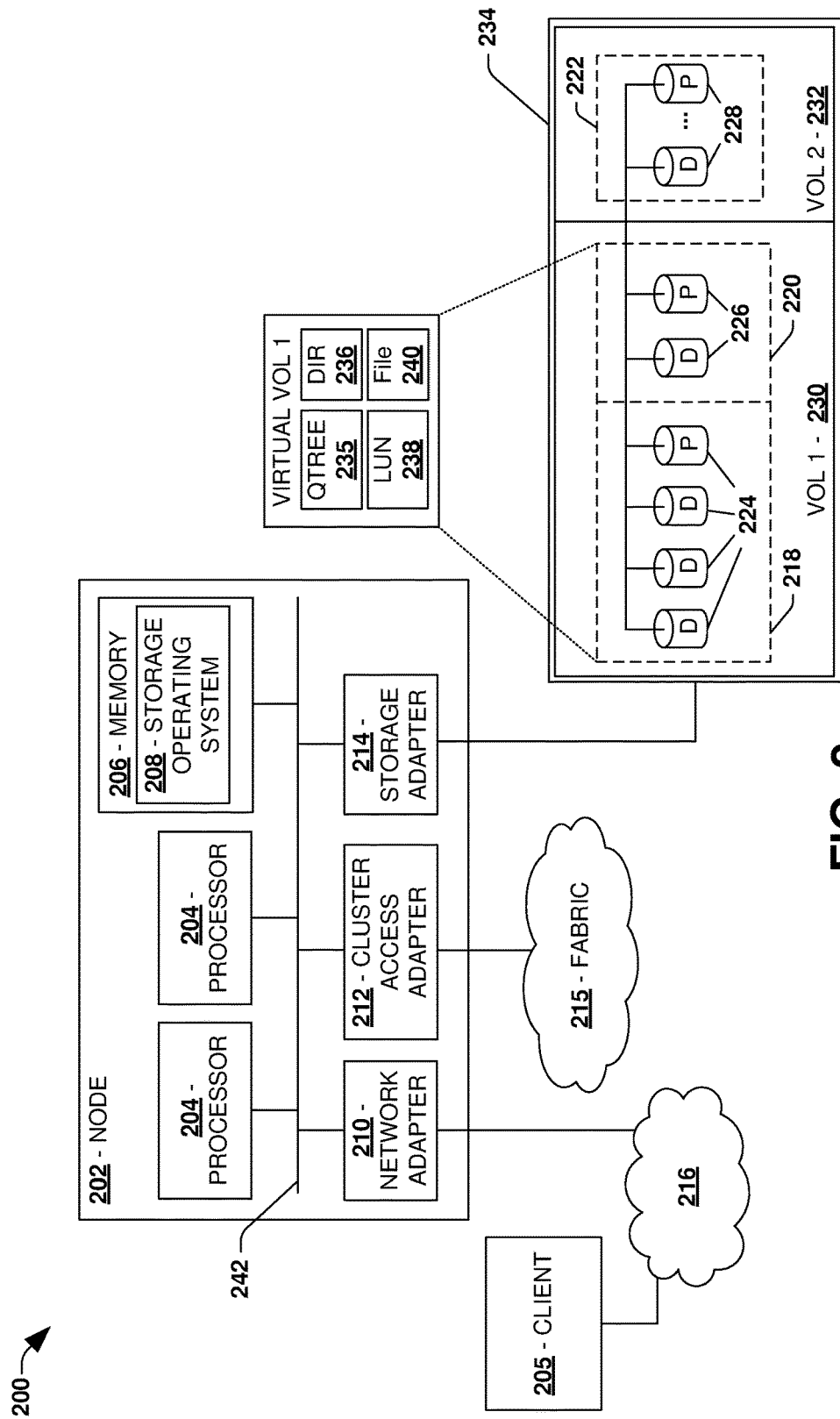
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that asynchronous semi-inline deduplication may be implemented for the data storage system 200. In an example, the one or more data storage devices 234 may be associated with a first storage tier. Asynchronous semi-inline deduplication may be performed for the one or more data storage devices 234 before "cold" data is moved from the one or more data storage devices 234 to a second storage tier. It may be appreciated that asynchronous semi-inline deduplication may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
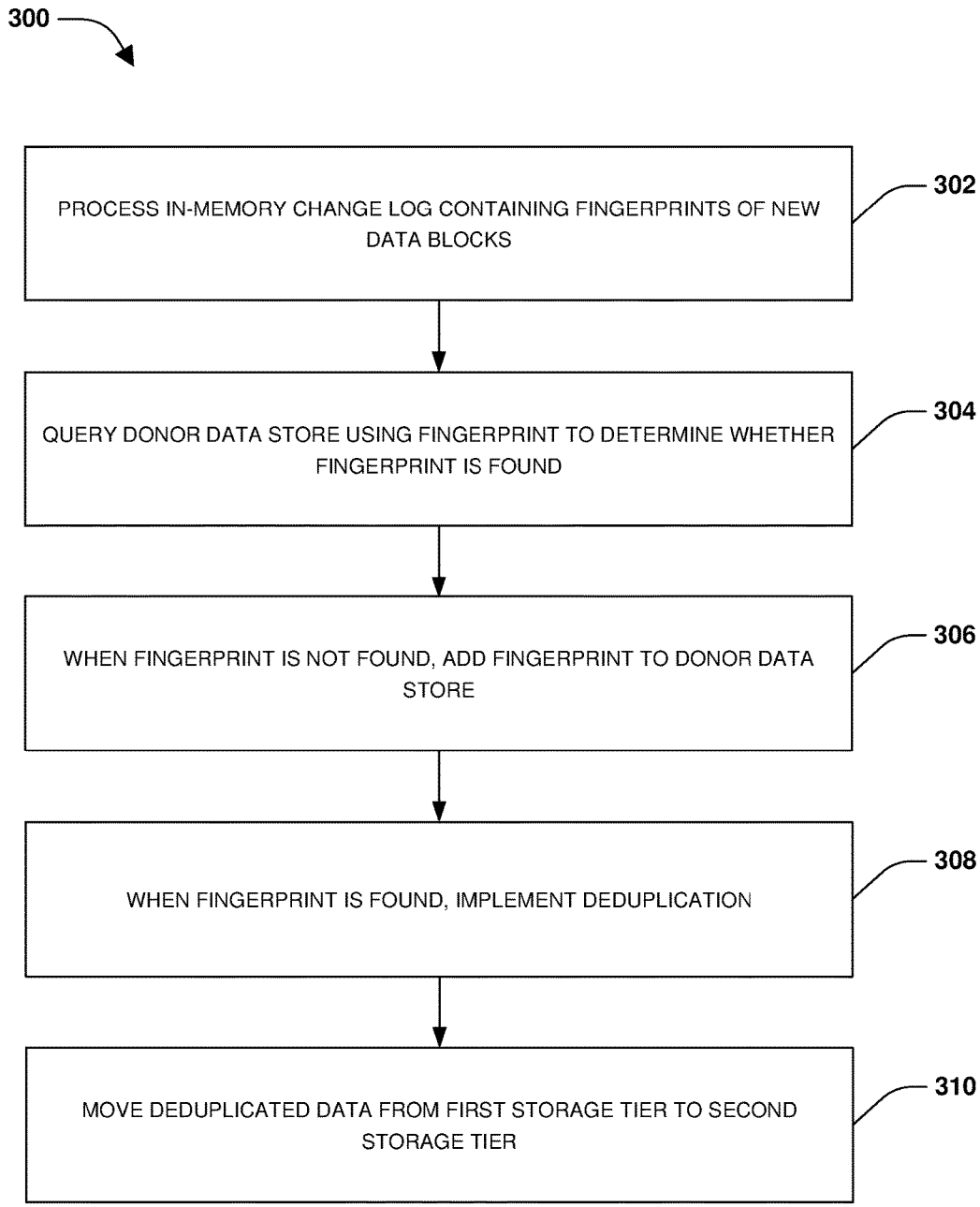
FIG. 3 is a flow chart illustrating an exemplary method of asynchronous semi-inline deduplication.

One embodiment of asynchronous semi-inline deduplication is illustrated by an exemplary method 300 of FIG. 3. In an example, a storage environment (e.g., a multi-tiered storage arrangement) may comprise multiple tiers of storage, such as tiers of different types of storage (e.g., a lower latency tier, a higher latency tier, etc.). For example, the storage environment comprises a first storage tier (e.g., a solid state storage tier), a second storage tier (e.g., a hard disk drive storage tier), a third storage tier, etc. Data may be initially stored within the first storage tier. When the data becomes "cold" due to infrequent access, the "cold" data may be moved from the first storage tier to the second storage tier. In this way, frequently accessed "hot" data may remain within the first storage tier for quick access. An in-memory change log, residing in random access memory (RAM), is maintained to keep track of fingerprints of the new data blocks written to the first storage tier. In-memory fingerprints are used to find redundant data from the donor database and perform deduplication. The whole operation of deduplication for the new writes in first storage tier will be performed before "cold" data is identified and moved to the second storage tier. The asynchronous semi inline deduplication uses the in-memory change log, which is in contrast to post process deduplication that maintains a persistent change log and will be processed through scheduled or manual operation. The asynchronous semi-inline will process the in-memory change log continuously as long as there is incoming new writes to first storage tier.

At 302, the in-memory change log, which tracks the new data written to the first storage tier, is processed. The in-memory change log contains fingerprint information of a new data block that may include block information in a file system and checksum computed on the data of the new data block. In an example, a set of data blocks written to the first storage tier may be identified from the in-memory change log, such as for batch deduplication processing. For example, a data block (1), a data block (2), and a data block (3) may have been written to the first storage tier. In this way, the in-memory change log may identify data blocks recently written to the first storage tier.

Storage space within the first storage tier may be allocated to store a donor data store. In an example, the donor data store may comprise a B+ tree or any other data structure. The donor data store may comprise fingerprint entries used to store fingerprints of data blocks already stored within the first storage tier (e.g., fingerprints of all unique data blocks of the first storage tier). In this way, the donor data store may be used to identify redundant data within the first storage tier by matching fingerprints of newly written data blocks, identified from the in-memory change log, to fingerprints of already stored data blocks within the first storage tier.

At 304, the donor data store may be queried using the fingerprint of in-memory change-logged blocks to determine whether a match is found within the donor data store. If a match is found, then a donor data block, comprising the same data as the data block, already exists within the first storage tier and thus the data block comprises duplicate/redundant. Otherwise if the fingerprint is not found within the donor data store, then the data block comprises unique/non-redundant data not already stored within the first storage tier. The donor data store may comprise fingerprint entries of fingerprints of data blocks already stored within the first storage tier before entries within the in-memory change log were recorded. For example, newly written data blocks, written to the first storage tier, may be recorded within the in-memory change log, and the donor data store may comprise fingerprint entries of data blocks (potential donor data blocks). In this way, the in-memory change log and the donor data store may be compared to determine whether newly written data blocks comprise the same data as potential donor data blocks already existing within the first storage tier.

In an example where a set of data blocks were identified from the in-memory change log for batch deduplication, the donor data store may be queried using fingerprints of the set of data blocks to identify a subset of the set of data blocks having fingerprints matching a set of target fingerprint entries within the donor data store. For example, fingerprints of the data block (1), the data block (2), and the data block (3) may be used to query the donor data store. The fingerprints of the data block (1) and the data block (3) may be found within the donor data store. However, a fingerprint of the data block (2) may not be found within the donor data store. Accordingly, the subset of the set of data blocks may comprise the data block (1) and the data block (3) having fingerprints that match a set of target fingerprint entries within the donor data store. Thus, the data block (2) may comprise unique data not already stored within the first storage tier, while the data block (1) and the data block (3) may comprise duplicate/redundant data already stored within the first storage tier by potential donor data blocks.

At 306, when the fingerprint is not found within the donor data store (e.g., the fingerprint of data block (2) does not match any fingerprint entries within the donor data store), the fingerprint is added to the donor data store as a new fingerprint entry. The new fingerprint entry provides a new indication that the data block (2) is now stored within the first storage tier and is available as a potential donor block for subsequent identification of duplicate data. The data block (2) may be maintained within the first storage tier since the data block (2) comprises unique data.

At 308, when the fingerprint is found within a target fingerprint entry for a potential donor data block stored within the first storage tier (e.g., the fingerprint of data block (1) matches a target fingerprint entry for a data block already stored within the first storage tier, thus indicating that the data block (1) comprises the same/redundant data as the data block), deduplication may be implemented for the data block based upon the potential donor data block to create deduplicated data within the first storage tier. In an example, deduplication information of the data block (1) and the potential donor data block (e.g., a deduplication pair) may be sent to a sharing engine for performing deduplication (e.g., a block sharing state machine may perform deduplication so that the data block (1) and the potential donor data block share data as opposed to storing two separate and redundant instances of the same data). In an example, data block information of the potential donor data block may be prefetched and provided to the sharing engine for use in implementing deduplication. In an example, data of the data block (1) may be deallocated from the first storage tier (e.g., an instance of the data stored by the data block (1) may be deallocated and merely the original instance of the potential donor data block may be retained, and thus the data block (1) may merely reference/share the data of the potential donor data block). In an example, the data block (1) and the potential donor data block may now share the same data as a result of deduplication. In an example, a result of the deduplication may be referred to as deduplicated data, which comprises the donor data block and a reference count for the donor data block that specifies a number of times the donor data block is shared due to deduplication. The deduplicated data does not comprise redundant data that was deallocated from deduplication.

By performing asynchronous semi-inline deduplication, less data may be processed by any subsequent offline deduplication functionality for a later storage tier (e.g., the second storage tier) in order to avoid wasting resources on redundant deduplication. In an example, the deduplication may be performed according to a quality of service policy (e.g., deduplication may be prioritized and/or performed in a manner that does not increase latency of client I/O operations above a threshold amount specified by the quality of service policy). In an example, deduplication statistics may be collected for the sharing engine (e.g., an amount of time to perform deduplication, an amount of detected duplicate data, an impact on client I/O latency, storage savings from deduplication, etc.).

In an example where the subset of the set of data blocks having fingerprints matching target fingerprint entries was identified (e.g., data block (1) and data block (3)) for batch deduplication, the subset of the set of data blocks and the potential donor data blocks referenced by the set of target fingerprints (e.g., deduplication pairs) may be accumulated into a sharing message. Based upon a trigger (e.g., a threshold amount of deduplication pairs being stored within the sharing message), the sharing message may be sent to the sharing engine for batch deduplication of the subset of the set of data blocks. In this way, deduplicated data is produced.

At 310, the deduplicated data (e.g., the donor data block and a reference count of the donor data block, but not redundant data of data blocks that share the data of the donor data block, which were deallocated due to deduplication) may be moved from the first storage tier to the second storage tier based upon a data access metric or any other metric (e.g., an indication that the deduplicated data, such as the data shared by the data block (1) and the potential donor data block for the data block (1), is being infrequently accessed). For example, the data access metric may specify that data of the first storage tier is to be moved from the first storage tier to the second storage tier based upon a frequency of access to the data falling below a threshold or based upon a threshold amount of time occurring since a last access to the data. Here the semi inline deduplication is performed before data is moved to the second storage tier, which can reduce on-disk fragmentation otherwise resulting from performing post process deduplication at the second storage tier such as a hard disk drive storage tier. Also, performing such semi inline deduplication reduces data transfer bandwidth otherwise wasted in transmitting redundant data between the storage tiers.

It may be appreciated that asynchronous semi-inline deduplication may be performed for multiple tiers of the multi-tiered storage arrangement (e.g., within a RAM/memory storage tier, within a solid state drive storage tier, within a hard disk drive storage tier, within a cloud storage tier, etc.) before data is moved between tiers. For example, a second in-memory change log of data written to the second storage tier may be evaluated to identify a set of fingerprints of data blocks written to the second storage tier. The second in-memory change log may be stored within the second storage tier. A second donor data store, comprising fingerprint entries of fingerprints of data stored within the second storage tier, may be queried using the set of fingerprints to identify a set of potential donor data blocks, within the second storage tier, that are referenced by fingerprint entries within the second donor data store matching the set of fingerprints. Deduplication may be implemented for the set of data blocks within the second storage tier based upon the set of potential donor data blocks within the second storage tier (e.g., the set of data blocks and the set of potential donor data blocks may now share the same data) to create second deduplicated data within the second storage tier. The second deduplicated data may be moved from the second storage tier to a third storage tier based upon a second data access metric.

Figure 4A:
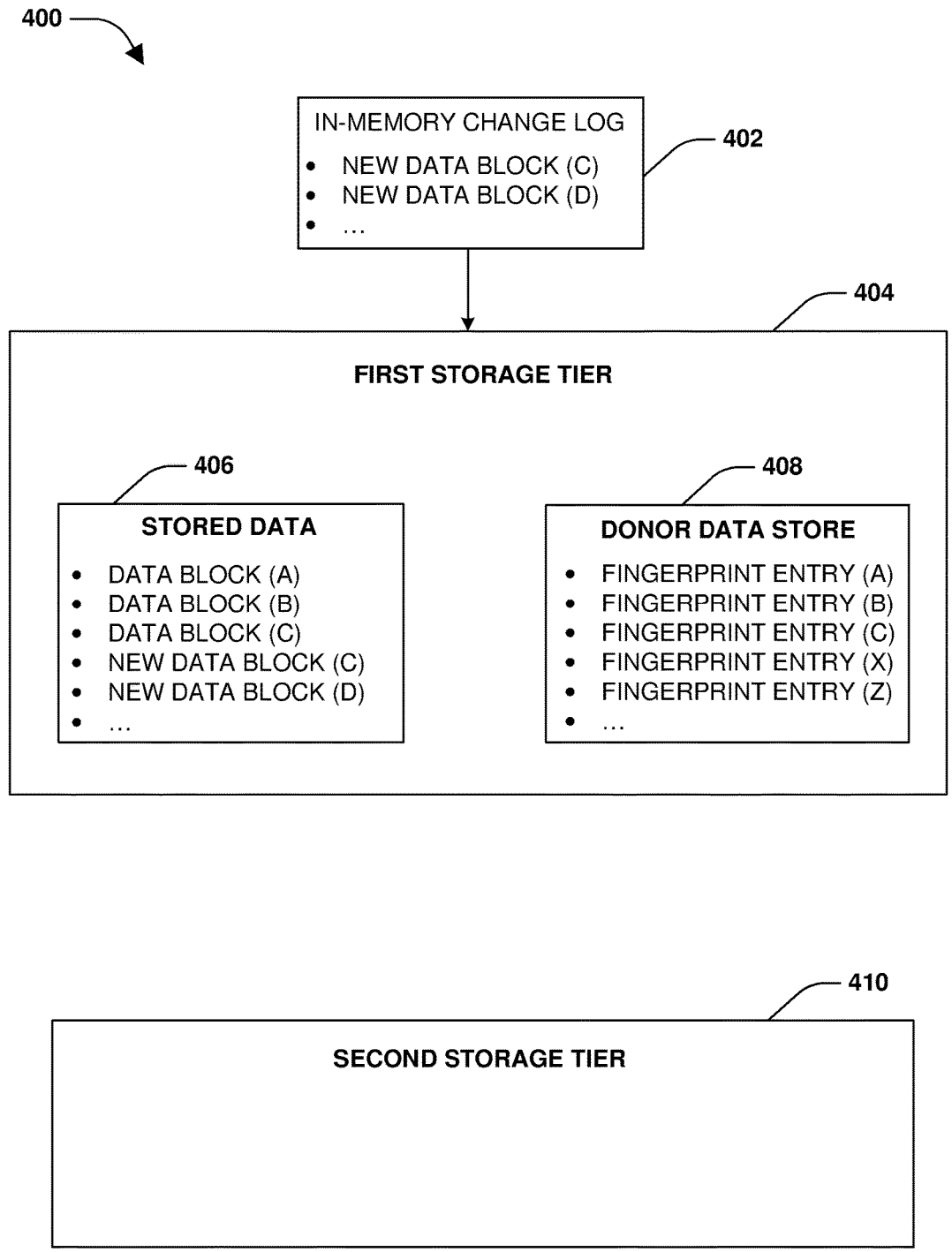
FIG. 4A is a component block diagram illustrating an exemplary computing device for asynchronous semi-inline deduplication, where an in-memory change log residing in random access memory (RAM) is evaluated.

FIGS. 4A-4F illustrate examples of a system for asynchronous semi-inline deduplication. FIG. 4A illustrates a multi-tiered storage arrangement comprising a first storage tier 404, a second storage tier 410, and/or other storage tiers not illustrated. The first storage tier 404 may be configured to store data written to the first storage tier as stored data 406. For example, the first storage tier 404 may store a data block (A), a data block (B), a data block (C), a data block (X), a data block (Z), and/or other data blocks at a first point in time (e.g., since a last time an in-memory change log 402 was processed and a donor data store 408 was updated). The donor data store 408 is used to store fingerprints of data blocks (e.g., potential donor data blocks) already stored within the first storage tier 404 (e.g., data blocks stored before the last time the in-memory change log 402 was processed and the donor data store 408 was updated).

As new data blocks are written to the first storage tier 404, the in-memory change log 402 is maintained to track the newly written data blocks to the first storage tier 404. For example, a new data block (C), a new data block (D), and/or other new data blocks may be written to the first storage tier 404. In this way, the in-memory change log 402 may be evaluated (e.g., at a second point in time, which may be triggered based upon an amount of time elapsing, a threshold amount of new data being written to the first storage tier 404, the in-memory change log 402 becoming full, etc.) to identify the newly written data, such as the new data block (C) and the new data block (D), which may be evaluated for asynchronous semi-inline deduplication.

Figure 4B:
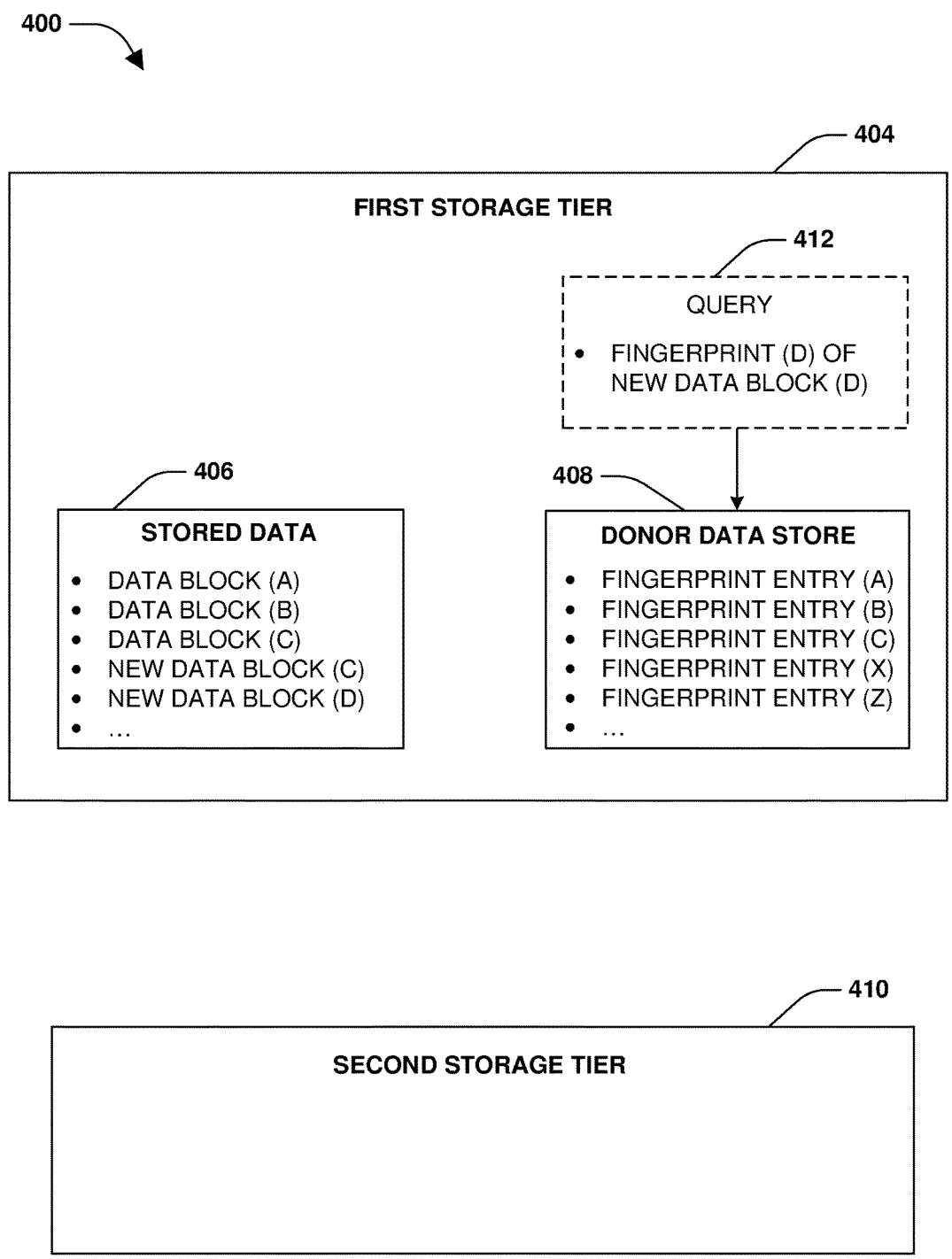
FIG. 4B is a component block diagram illustrating an exemplary computing device for asynchronous semi-inline deduplication, where a donor data structure is queried.

FIG. 4B illustrates the donor data store 408 being queried 412 using a fingerprint (D) of the new data block (D) to determine whether any fingerprint entries within the donor data store 408 match the fingerprint (D). For example, the fingerprint (D) may not be found within the donor data store 408. Accordingly, the new data block (D) may comprise unique data not already stored within the first storage tier 404.

Figure 4C:
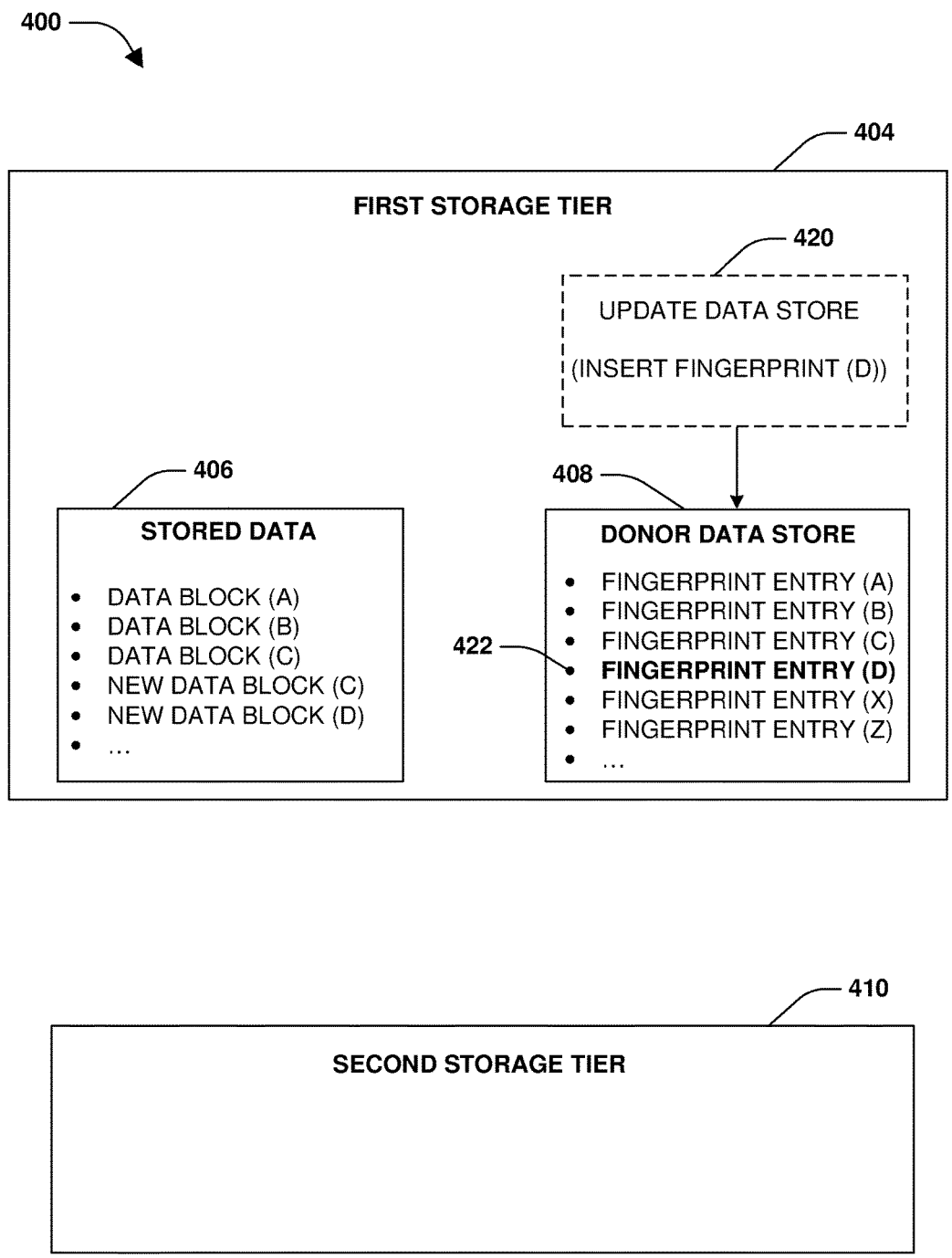
FIG. 4C is a component block diagram illustrating an exemplary computing device for asynchronous semi-inline deduplication, where a donor data store is updated.

FIG. 4C illustrates the donor data store 408 being updated 420 based upon the new data block (D) comprising unique data not already stored within the first storage tier 404. In particular, a fingerprint entry (D) 422 is inserted into the donor data store 408. The fingerprint entry (D) 422 comprises the fingerprint (D) of the new data block (D). In this way, subsequent deduplication may take into account the new data block (D) for determining whether subsequently written data matches data of the new data block (D), and thus should be deduplicated. The data of new data block (D) may be retained within the first storage tier 404 because the data of new data block (D) is unique.

Figure 4D:
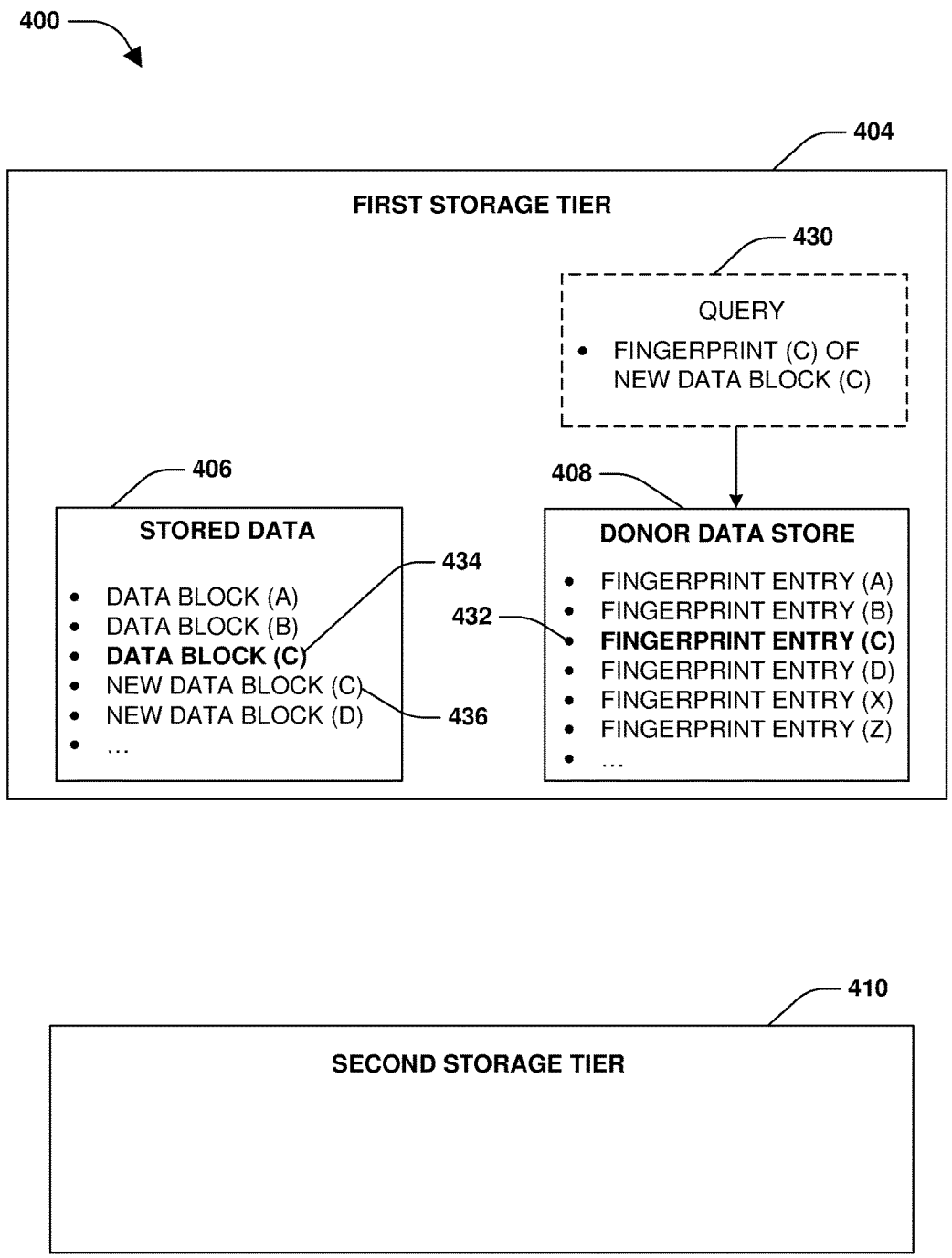
FIG. 4D is a component block diagram illustrating an exemplary computing device for asynchronous semi-inline deduplication, where a donor data store is queried.

FIG. 4D illustrates a second query 430 being performed upon the donor data store 408. In particular, the donor data store 408 is queried using a fingerprint (C) of the new data block (C) 436 to determine whether any fingerprint entries within the donor data store 408 match the fingerprint (C). For example, the fingerprint (C) may match a fingerprint entry (C) 432 within the donor data store 408, which indicates that data of the new data block (C) 436 was already stored within the first storage tier 404 as data block (C) 434 (e.g., a potential donor data block for the new data block (C) 436) to which the fingerprint (C) refers. In this way, the new data block (C) 436 may be identified as comprising redundant/duplicate data already stored within the first storage tier 404 by the data block (C) 434.

Figure 4E:
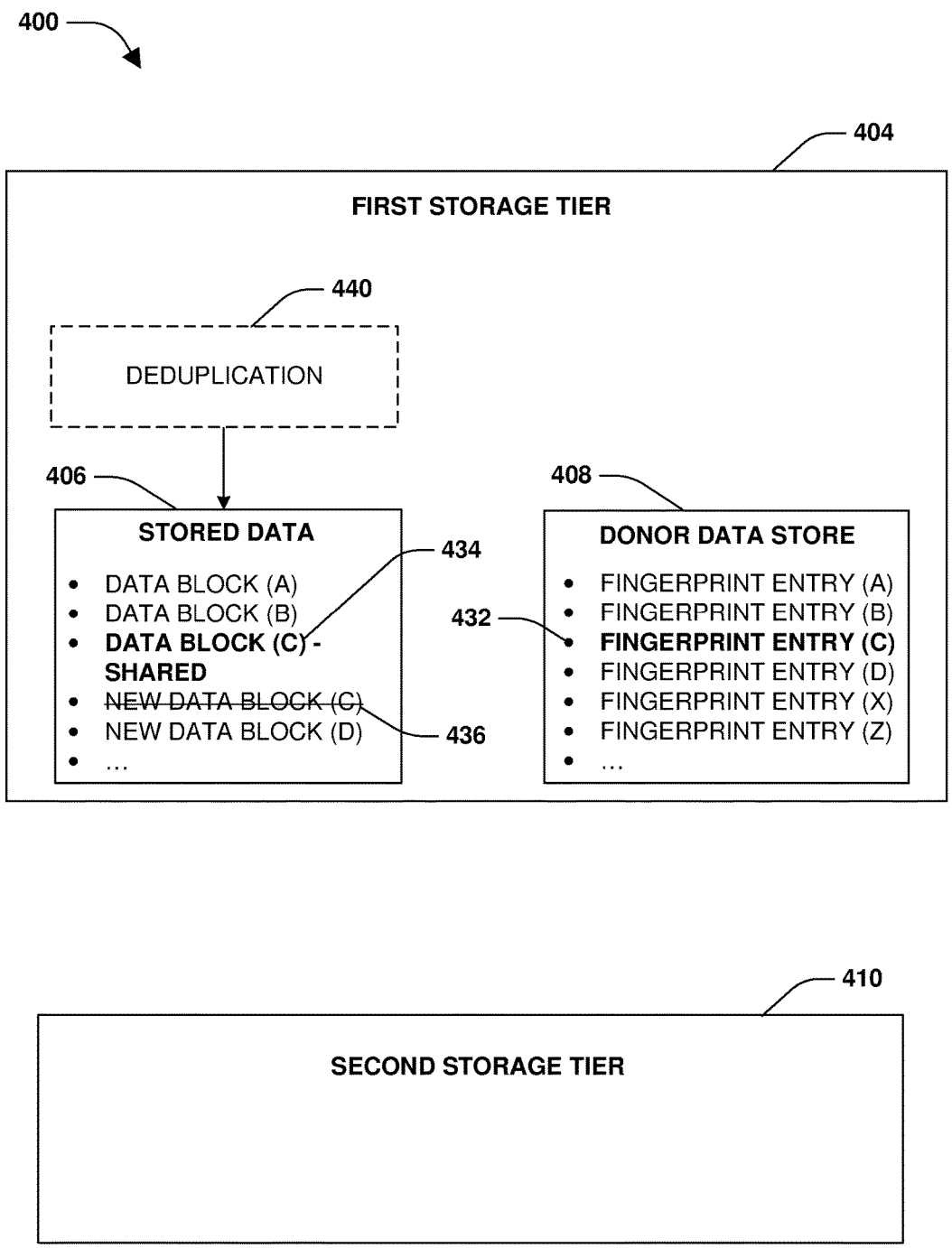
FIG. 4E is a component block diagram illustrating an exemplary computing device for asynchronous semi-inline deduplication, where deduplication is implemented.

FIG. 4E illustrates deduplication 440 being implemented upon the stored data 406 of the first storage tier 404. For example, data of the new data block (C) 436 may be deallocated by a sharing engine that implements the deduplication 440. The sharing engine may perform the deduplication 440 such that the data block (C) 434 and the new data block (C) 436 reference the same data instead of referencing separate instances of the same data. In this way, the first storage tier 404 now comprises deduplicated data as a result of the deduplication 440.

Figure 4F:
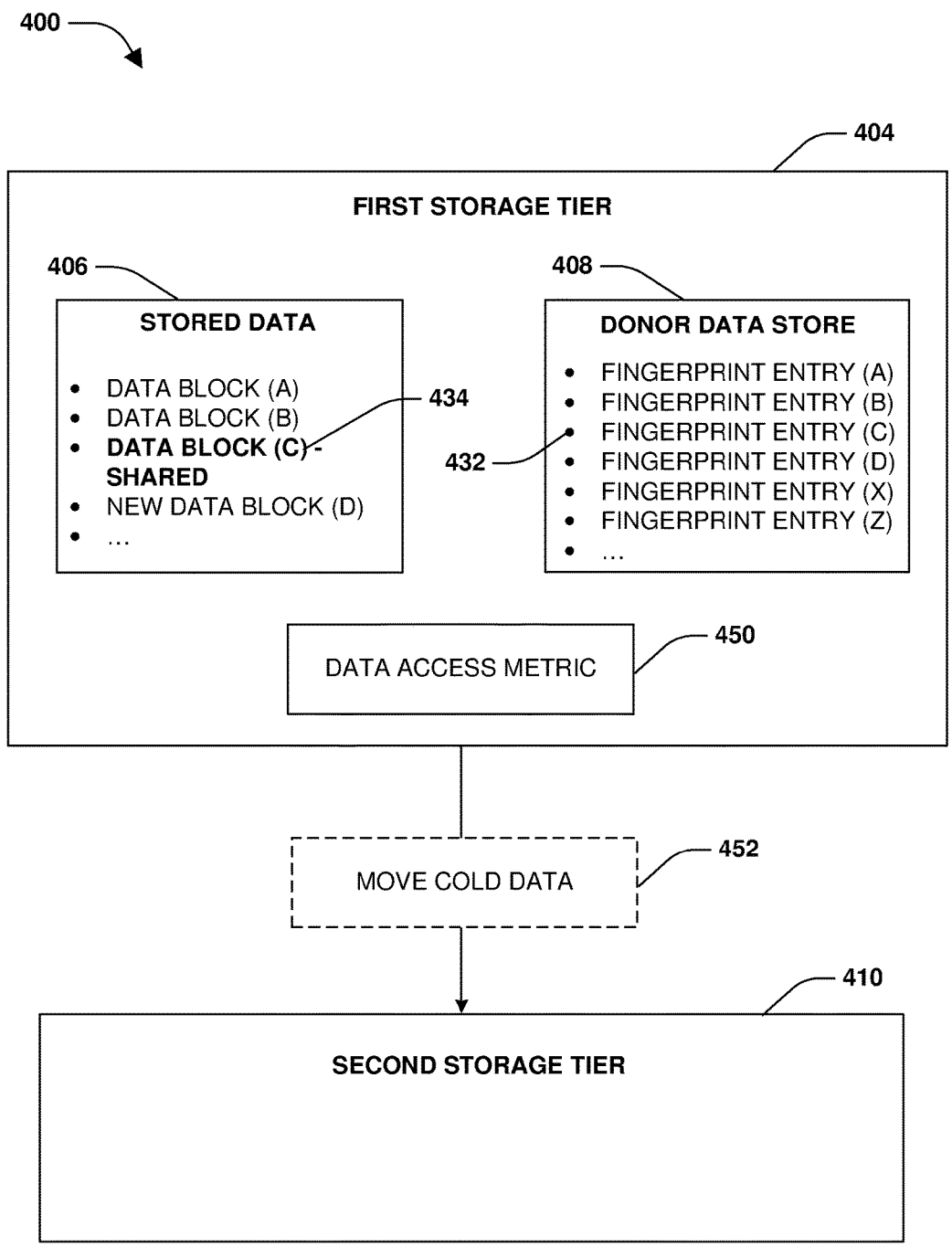
FIG. 4F is a component block diagram illustrating an exemplary computing device for asynchronous semi-inline deduplication, where cold data is moved from a first storage tier to a second storage tier.

FIG. 4F illustrates a data access metric 450 being used to identify "cold" data to be moved 452 from the first storage tier 404 to the second storage tier 410. The data access metric 450 may specify that if data has not been recently accessed for more than a specific amount of time and/or a frequency of access to the data has fallen below a threshold, then the data is identified as "cold" data that is to be moved 452 to the second storage tier 410. In an example, the deduplicated data shared by the data block (C) 434 and the new data block (C) 436 is identified as "cold" deduplicated data that is moved 452 to the second storage tier 410. When the deduplicated data (e.g., a donor data block and a reference count of the donor data block) is moved 452, merely a single instance of data block (C) 434 is moved to the second storage tier 410 along with a reference count of the number of times the data of data block (C) 434 is shared from deduplication.

Figure 5:
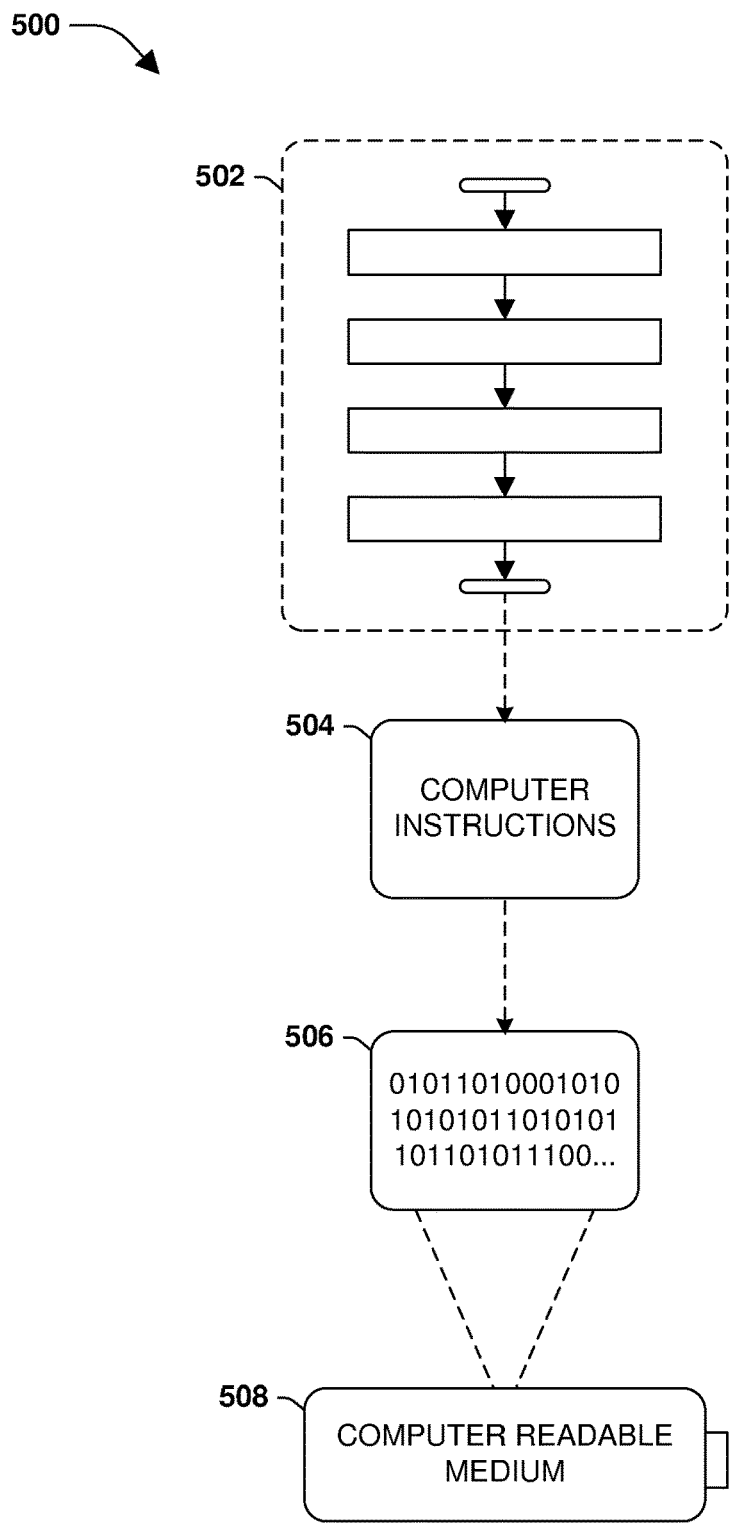
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4F, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   tracking, within a log, data blocks written to a first storage tier of a cloud computing environment comprising the first storage tier and a second storage tier;
   evaluating the log to identify a fingerprint of a data block written to the first storage tier;
   querying a data store of fingerprints of data blocks stored within the first storage tier using the fingerprint to determine whether the fingerprint is found within the data store; and
   storing the fingerprint within the data store based upon the fingerprint being absent from the data store.

2. The method of claim 1, comprising
   implementing deduplication for the data block based upon the fingerprint being found within the data store, as a matching fingerprint of a donor data block within the first storage tier, to create deduplicated data within the first storage tier.

3. The method of claim 2, comprising:
   moving the deduplicated data from the first storage tier to the second storage tier based upon a data access metric.

4. The method of claim 3, wherein the data access metric specifies that data of the first storage tier is to be moved from the first storage tier to the second storage tier based upon a frequency of access to the data falling below a threshold.

5. The method of claim 2, wherein the implementing deduplication comprises:
   sending deduplication information of the data block and the donor data block to a sharing engine for performing deduplication.

6. The method of claim 2, wherein the implementing deduplication comprises:
   deallocating redundant data of the data block and incrementing a reference count of the donor data block.

7. The method of claim 2, comprising:
   performing the deduplication before cold data is moved from the first storage tier to the second storage tier.

8. The method of claim 2, comprising:
   collecting deduplication statistics from a sharing engine used to perform the deduplication.

9. The method of claim 2, wherein the log is used to track newly written data blocks in the first storage tier and the log is continually processed for querying the data store for performing deduplication.

10. The method of claim 2, comprising:
    prefetching data block information of the donor data block to provide
    to a sharing engine used to implement deduplication.

11. The method of claim 2, wherein the deduplicated data comprises the donor data block and a reference count for the donor data block.

12. The method of claim 1, comprising:
    allocating storage space within the first storage tier of the cloud computing environment for storing the data store.

13. The method of claim 1, comprising:
    performing deduplication for the second storage tier to create deduplicated data, wherein the deduplication data is moved
    from the second storage tier to a third storage tier of the cloud computing environment based upon a second data access metric.

14. A non-transitory machine readable medium having stored thereon instructions, for performing a method, which when executed by a machine, causes the machine to:
- track, within a log, data blocks written to a first storage tier of a cloud computing environment comprising the first storage tier;
- evaluate the log to identify a fingerprint of a data block written to the first storage tier;
- query a data store of fingerprints of data blocks stored within the first storage tier using the fingerprint to determine whether the fingerprint is found within the data store;
- store the fingerprint within the data store based upon the fingerprint being absent from the data store; and
- implement deduplication for the data block based upon the fingerprint being found within the data store, as a matching fingerprint of a donor block within the first storage tier, to create deduplicated data within the first storage tier.

15. The non-transitory machine readable medium of claim 14, wherein the instructions cause the machine to:
- moving the deduplicated data from the first storage tier to a second storage tier based upon a data access metric.

16. The non-transitory machine readable medium of claim 15, wherein the second storage tier is hosted by a computing device remote to the cloud computing environment.

17. The non-transitory machine readable medium of claim 15, wherein the second storage tier is hosted by a computing device within the cloud computing environment.

18. A computing device comprising:
- a memory comprising machine executable code; and
- a processor coupled to the memory, the processor configured to execute the machine executable code to cause the processor to:
  - track, within a log, data blocks written to a first storage tier of a cloud computing environment comprising the first storage tier;
  - evaluate the log to identify a fingerprint of a data block written to the first storage tier;
  - query a data store of fingerprints of data blocks stored within the first storage tier using the fingerprint to determine whether the fingerprint is found within the data store;
  - store the fingerprint within the data store based upon the fingerprint being absent from the data store; and
  - implement deduplication for the data block based upon the fingerprint being found within the data store, as a matching fingerprint of a donor block within the first storage tier, to create deduplicated data within the first storage tier.

19. The computing device of claim 18, wherein the computing device is remote to the cloud computing environment.

20. The computing device of claim 18, wherein the computing device is hosted within the cloud computing environment.

* * * * *